Figure 1:
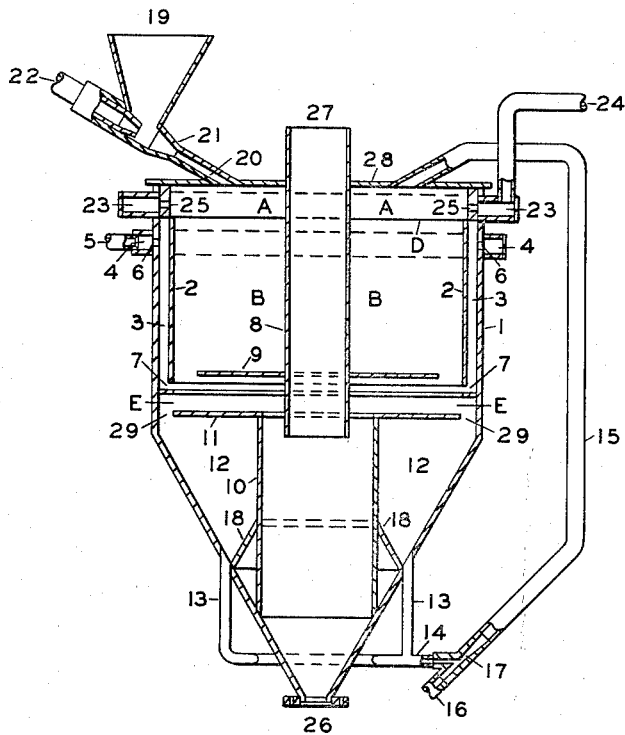
Figure 2:
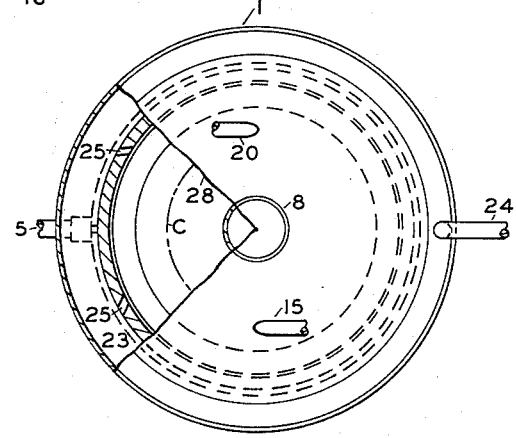
Figure 3:
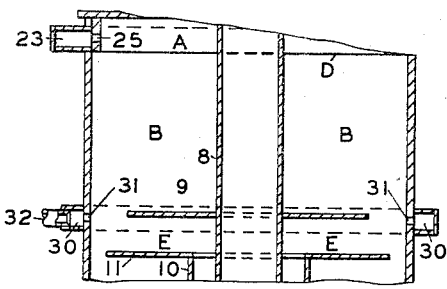

Nov. 1, 1960

E. A. ERICKSON ET AL 2,958,472

FINE PARTICLE PULVERIZER AND CLASSIFIER

Filed Nov. 23, 1956

INVENTOR
Edward A. Erickson + Henry J. Nieschlag
BY Arthur L. Lukens Jr.
ATTORNEY 2,958,472
Patented Nov. 1, 1960

2,958,472

FINE PARTICLE PULVERIZER AND CLASSIFIER

Edward A. Erickson, Terre Haute, Ind., and Henry J. Nieschlag, Metamora, Ill., assignors to Commercial Solvents Corporation, Terre Haute, Ind., a corporation of Maryland Filed Nov. 23, 1956, Ser. No. 624,167

3 Claims. (Cl. 241—39)

Our invention relates to fine particle pulverizing and classifying and more particularly it relates to a new process and apparatus for pulverizing and classifying fine (micron size) particles.

In the art of fine particle pulverizing, the most difficult task to accomplish is classification of the pulverized material so that the eventual product of desired size is separated from the larger oversize particles which have not been satisfactorily pulverized. Suitable apparatus for effecting the pulverization alone is presently available but the art is in need of a method and apparatus for effecting classification of the pulverized material.

We have now discovered a process and apparatus which can be operated in conjunction with pulverizing means for classifying the fine particles obtained upon pulverization. Our apparatus is relatively simple and economical and, in the preferred embodiment, requires no moving parts.

Our invention relates to pulverization and classification to obtain a fine particle product of relatively narrow size range. For example we can pulverize and classify a material 80% of which has a particle size of over 50 microns and 26% of which has a particle size of over 100 microns to obtain a product 90% of which has a particle size of less than 50 microns and 60% of which has a particle size of less than 30 microns.

Figure I is a schematic vertical section through our new apparatus.

Figure II is a plan of the apparatus shown in Figure I, partially cut away to show details.

Figure III is a schematic vertical section of part of our new apparatus showing a further embodiment thereof.

Referring to Figure I, the apparatus there depicted consists of a cylindrical shell 1 having a conical bottom. For purposes of description, the interior of the cylinder is divided into three sections, the section A above the line D being the pulverizing section, the section B, below the line D, being the classification section, and the section E between the baffle 9 and flange 11 being the disengaging zone. The cylinder has an inner wall 2 spaced from the wall of the cylinder and forming an annular air chamber 3 in the upper portion thereof. An air chamber 4 surrounds the cylinder at the upper portion of the classification section having an air inlet 5, the circular air chamber 4 communicating with the air chamber 3 through openings 6. The air chamber communicates with the interior of the cylinder through the air opening 7 at the bottom of the air chamber. An upper outlet tube 8, having a peripheral baffle 9, is positioned concentrically in the cylinder and partially telescoped into a lower outlet tube 10, having the flange 11 attached to the upper end thereof, thus forming a cyclone separator. The lower outlet tube 10 and flange 11 form a recycle zone 12 from which material can be withdrawn through lines 13. The recycle zone outlets 13 lead through line 14 to recycle tube 15 having an air inlet 16 and an orifice 17, the recycle apparatus operating on the principle of an aspirator. The baffle 18 in the recycle zone 12 operates to direct the materials to be recycled to the recycle outlet 13.

The feed apparatus leading to the pulverizing section A in the upper portion of the cylinder 1 consists of a feed hopper 19 and a feed line 20 having an orifice 21 and an air inlet 22 such that the feed apparatus operates on the principle of an aspirator. The pulverizing section A of the cylinder is surrounded by an air ring 23 having an air inlet 24. The air ring 23 communicates with the interior of the cylinder through a number of jet openings 25. Referring to Figure II, the jet openings 25 are drilled at an angle in the wall of the cylinder such that they are tangent to the imaginary circle C.

The outlets from the apparatus are through the lower outlet tube having an exit 26 and the upper outlet tube having an exit 27. The cover 28 encloses the upper portion of the cylinder.

The outlets from the apparatus are through the lower outlet tube having an exit 26 and the upper outlet tube having an exit 27. The cover 28 encloses the upper portion of the cylinder.

In the operation of our apparatus, the material to be pulverized is filled into the hopper 19 from which it is fed to the pulverizing section by means of the aspirator, air being introduced at line 22 and the flow passing through the orifice 21 and the line 20 to the pulverizing section A of the apparatus. The grinding air is introduced through line 24 to the air ring 23 from which the air is injected through jet orifices 25 into the grinding section A. The compressed air issuing through these jet orifices maintains a high speed of rotation in the grinding chamber and the solid particles fed to the apparatus are accelerated by the rotating air and thrown towards the periphery where a portion coming into the zone of action of a subsequent jet orifice is further accelerated tangentially inwardly causing violent impact between the particles thus accelerated and causing the pulverization of the material fed to the apparatus. As the pulverized particles rotate in the pulverizing section, they begin to sink from the pulverizing zone to form a gaseous vortex which spirals downwardly into the classification zone B. During the rotation of the particles in the pulverizing zone and classification zone, centrifugal action forces the larger particles to the outside, while the entrainment force of the air carries the finer particles to the center thus effecting a classification of the materials pulverized. The larger particles, however, build up on the wall 2 of the classification zone and carry much of the fine material with them. As the particles of material flow down the wall 2, they come in contact with the air stream from the air chamber 3 issuing through the air ring 7 which disperses the built up particles flowing down the wall thus disengaging the smaller size particles in the disengaging zone E, the larger size particles continuing to move to the outside. The larger particles then pass through the opening 29 between the flange 11 and the wall of the cylinder while the smaller particles pass through the disengaging zone E between the baffle 9 and the flange 11 to the cyclone separator formed by the upper outlet tube 8 and the lower outlet tube 10. The product is collected through the outlet 26 while the spent air is removed through the outlet 27. The larger particles are collected in the recycle zone 12 from which they are removed through lines 13 and 14 and returned to the pulverizing section through line 15 by the operation of the aspirator formed by the introduction of recycle air through line 16 and orifice 17.

In a further embodiment of our new apparatus, Figure III depicts a portion of the same general apparatus shown in Figure I except that the air chamber 3, chamber 4, air inlet 5, and air openings 6 and 7 are eliminated and in place thereof a circular air chamber 30 with air inlet 32 is provided to communicate directly to the upper portion of the disengaging zone through the circular air opening 31.

It is, of course, apparent to those skilled in the art that we can employ mechanical or other pulverizing means in place of the fluid pulverizing means described above. In such case, the mechanical or other pulverizing means can be employed in a single unit with the classification portion of the above described apparatus or the mechanical or other pulverizing means can be employed at a distance from the above-described apparatus and the pulverized material conducted to and introduced to the classification portion of the above-described apparatus in such a manner as to form a spiraling vortex as described above. For example the pulverized material can be blown to the classifier and introduced tangentially thereto.

In employing the fluid pulverizing means described above, we prefer to precrush or deagglomerate the particles to be pulverized to a size less than about 10 mesh, particularly when it is necessary to rigidly adhere to a maximum allowable particle size in the product.

The pressure of the grinding air introduced to our above-described apparatus depends on the material being pulverized and the desired size of particles. We prefer to employ pressures less than about 100-200 p.s.i. but higher pressures can be employed. The pressure of the air introduced at 22 in the feeding portion of the apparatus for any given grinding air pressure depends upon the rate of feed desired, which in turn depends upon the desired particle size of the product i.e. the higher the feed rate, the larger the particle size of the product for any given grinding air pressure. It is, of course, obvious that the air feed pressure must be high enough to overcome the pressure back through line 20 caused by introduction of the grinding air and, in addition, high enough to operate the feed aspirator i.e. provide a suction at the base of feed hopper 19. The recycle air pressure and the pressure of the air introduced to the air chamber 3 depend upon a number of variables including the grinding air pressure, the material being pulverized, the desired size of the product, etc., and can be adjusted to secure optimum results. Other gaseous fluids, such as steam, nitrogen, etc., can be employed if, for example, air is not available or causes decomposition of the material being pulverized and classified. However, we prefer whenever possible to use air.

Our new process and apparatus can be used for pulverizing and classifying many different types of materials including minerals, ores, metals, pigments, insecticides, fungicides, pharmaceuticals, plastics, dyes, etc. For different materials, it is, of course, obvious that different conditions of operation are employed. For example, some materials to be pulverized have low melting points and the temperature in the apparatus in such case should be maintained below that point. The existence of an explosion hazard can dictate the use of a dust filter and other variations are obvious to those skilled in the art.

A convenient and useful method for the analysis of particle size of a material is contained in the ASTM Bulletin for January 1940, at page 29. Using this method, we prefer to show the results as the percentage of the total amount of material which is over a certain micron size.

The following example is offered to illustrate our invention; however, we do not intend to be limited to the specific materials, proportions, or procedures described. Rather we intend to include within the scope of our invention all equivalents obvious to those skilled in the art.

EXAMPLE I

Procaine penicillin was introduced at the rate of 100 grams per minute to the apparatus shown in Figure I and described above, the particular apparatus being 8 inches in diameter (I.D.) and 21¼ inches in height overall. A grinding air pressure of 40 p.s.i., a recycle aspirator air pressure of 45 p.s.i., a feed aspirator air pressure of 15 p.s.i. and an air chamber pressure of 10 p.s.i were used. The procaine penicillin fed to the apparatus had the following particle size distribution.

*Table I*
PARTICLE SIZE DISTRIBUTION

| Microns: | Amount of procaine penicillin—percent |
|---|---|
| Over 100 | 26.7 |
| Over 80 | 43.9 |
| Over 60 | 66.7 |
| Over 50 | 80.6 |
| Over 40 | 90.0 |
| Over 30 | 97.2 |
| Over 25 | 100 |

The pulverized and classified procaine penicillin product had the following particle size analysis.

*Table II*
PARTICLE SIZE DISTRIBUTION

| Microns: | Amount of procaine penicillin—percent |
|---|---|
| over 100 | 0 |
| over 80 | 2.5 |
| over 60 | 6.7 |
| over 50 | 9.2 |
| over 40 | 19.2 |
| over 30 | 40.8 |
| over 25 | 54.2 |
| over 20 | 65.8 |

The product obtained in Example I was formulated as an aqueous suspension having a viscosity of 4.79 centistokes at 25° C. The drainage characteristics of the aqueous suspension were found to be very excellent and as far as syringability is concerned, when tested 25 times using a dry syringe with a 26 gauge needle, the material did not plug the needle or bind the syringe. The same results were obtained on the syringability test after the material had been stored one week at 5° C.

As has been indicated above, our new process and apparatus can be employed with any suitable pulverizing means. The jet-fluid type can be employed as described above as can suitable hammer mills, disk attrition mills, ring roller mills, etc. This latter type of mechanical pulverizing means is more adequately described in Chemical Engineers Handbook, John H. Perry, Editor in Chief, Third edition (1950), McGraw-Hill Book Company, Inc. New York, at section 16. The limiting factor in the use of different pulverizing means is the ability of the equipment to pulverize the product to micron (micro) size.

Now having described our invention, what we claim is:

1. A pulverizer and classifier which comprises a cylinder having pulverizing means at its upper end, an inner wall in the upper portion of the cylinder spaced from and disposed annularly within the periphery of the cylinder and forming an annular space within the cylinder, a ring opening at the base of the inner wall forming a passage between the annular space and the interior of the cylinder, an upper outlet tube disposed concentrically in the cylinder and forming exit means from the cylinder at the top, a circular baffle plate attached peripherally to said upper outlet tube at a pont just above said ring opening, a lower outlet tube disposed concentrically in the cylinder and merging into an opening in the bottom of the cylinder, the said lower outlet tube being of larger diameter than the said upper outlet tube and the said upper outlet tube being partially telescoped into the said lower outlet tube below the said baffle plate, a flange extending about the periphery of the upper end of the lower outlet tube to form a recycle zone between the lower outlet tube and the cylinder wall and means communicating the recycle zone to the pulverizer.

2. An apparatus for the pulverization and classification of materials to micron size which comprises
a cylinder
a pulverizing means
   being attached to the upper end of said cylinder,
a gaseous fluid injection means
   to create cyclonic flow within said cylinder,
an inlet for solid materials to said pulverizing means
an upper outlet tube
   disposed concentrically in the said cylinder and forming the exit means from the cylinder at the top
a circular baffle plate
   attached peripherally to the lower portion of said upper outlet tube,
an inner wall spaced from the cylinder and the circular baffle plate,
a circular gaseous fluid chamber formed by the said cylinder and the said inner wall,
   the said circular gaseous fluid chamber communicating with the interior of the cylinder by means of an opening at its lower end, the said opening being situated below the circular baffle plate attached to the said upper outlet tube
a lower outlet tube
   disposed concentrically in the cylinder and merging into an opening in the bottom of the cylinder, said lower outlet tube being of larger diameter than said upper outlet tube and said upper outlet tube being partially telescoped into said lower outlet tube below the said baffle plate,
a flange
   extending about the periphery of the upper end of the lower outlet tube to form a recycle zone between the lower outlet tube and the cylinder wall and means of communicating the recycle zone to the pulverizer.

3. An apparatus for the classification of micron-sized materials which comprises a cylinder, a gaseous fluid injection means to create the cyclonic flow within said cylinder, an upper outlet tube disposed concentrically in the said cylinder and forming the exit means from the cylinder at the top, a circular baffle plate attached peripherally to the lower portion of said upper outlet tube, an inner wall spaced from the cylinder and the circular baffle plate, a circular gaseous fluid chamber formed by the said cylinder and the said inner wall, the said circular gaseous fluid chamber communicating with the interior of the cylinder by means of an opening at its lower end, the said opening being situated below the circular baffle plate attached to the said upper outlet tube, a lower outlet tube disposed concentrically in the cylinder and merging into an opening in the bottom of the cylinder, said lower outlet tube being of larger diameter than said upper outlet tube and said upper outlet tube being partially telescoped into said lower outlet tube below the said baffle plate, a flange extending about the periphery of the upper zone of the lower outlet tube to form a recycle zone between the lower outlet tube and the cylinder wall.

References Cited in the file of this patent

UNITED STATES PATENTS

| | | |
|---|---|---|
| 1,756,960 | Stebbins | May 6, 1930 |
| 1,761,627 | Hine | June 3, 1930 |
| 2,624,460 | Parten | Jan. 6, 1953 |
| 2,701,056 | Morton | Feb. 1, 1955 |